(12) United States Patent
Hilpert

(10) Patent No.: US 6,329,723 B1
(45) Date of Patent: Dec. 11, 2001

(54) COOLANT TEMPERATURE CONTROL FOR REGULATING THE COOLANT TEMPERATURE OF A POWER CONVERTER OF AN ELECTRICALLY DRIVEN VEHICLE

(75) Inventor: Gerald Hilpert, Lauchringen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/345,508

(22) Filed: Jul. 1, 1999

(30) Foreign Application Priority Data

Jul. 9, 1998 (DE) .............................. 198 30 656

(51) Int. Cl.$^7$ .................................... B60K 11/06
(52) U.S. Cl. .................. 307/9.1; 62/259.2; 123/41.12
(58) Field of Search ................. 307/9.1; 62/207, 62/259.2; 123/41.12; 180/65.2

(56) References Cited

U.S. PATENT DOCUMENTS

| | | | |
|---|---|---|---|
| 4,415,847 | * 11/1983 | Galloway | 62/201 |
| 4,962,734 | * 10/1990 | Jorgensen | 123/41.12 |
| 5,531,285 | * 7/1996 | Green | 180/65.2 |
| 5,937,664 | * 8/1999 | Matsuno et al. | 62/259.2 |

FOREIGN PATENT DOCUMENTS

| | | |
|---|---|---|
| 0 821 468A2 | 1/1998 | (EP) . |
| 1-222652A | 9/1989 | (JP) . |
| 1-248955A | 10/1989 | (JP) . |

OTHER PUBLICATIONS

German Patent Office Search Report dated Feb. 15, 1999.
Gottschalk, G., u.a.: Variobahn die Stadtbahn der Zukunft. In: ABB Technik Apr. 1944, S.31 (p. 31).

* cited by examiner

Primary Examiner—Albert W. Paladini
(74) Attorney, Agent, or Firm—Burns, Doane, Swecker & Mathis, L.L.P.

(57) ABSTRACT

In a coolant temperature control (1) for regulating the coolant temperature of a power converter of an electrically driven vehicle, in particular an electrical locomotive, the coolant temperature is regulated to a set value (16) that is independent from the current ambient temperature in order to increase the life of the used high-performance traction power converters. As a result, the components are subject to less drastic temperature load alternations.

18 Claims, 2 Drawing Sheets

COOLANT TEMPERATURE CONTROL FOR REGULATING THE COOLANT TEMPERATURE OF A POWER CONVERTER OF AN ELECTRICALLY DRIVEN VEHICLE

FIELD OF TECHNOLOGY

The invention relates to the field of cooling technology of power electronic circuits. It is based on a coolant temperature control for regulating the coolant temperature of a power converter of an electrically driven vehicle, in particular an electric locomotive, according to the preamble of the first claim.

STATE OF THE ART

High performance traction power converters are constantly subject to fluctuations of the ambient temperature. These fluctuations are decisively influenced by the seasonal cycle and the daily cycle. Furthermore, coolant temperature fluctuations caused by the greatly varying power converter power loss during load cycles (standstill, start, driving, breaking) occur. The coolant of the power converter (for example oil or water with glycol) is dependent on the ambient temperature because of a coolant air recooler. The coolant temperature, and thus the temperature of the connected components, in particular of the semi-conductor power circuits, is kept as low as possible, and the power converter power loss is removed into the environment. During times of standstill and light load operation of the vehicle, the coolant is cooled relatively quickly to the ambient temperature. During high load operation, the coolant heats to about 10 to 20K over ambient temperature.

According to the state of the art, the coolant temperature therefore follows the ambient temperature, except for the temperature differentials caused by the load cycle. The ambient temperature fluctuations and overlapping load cycle temperature fluctuations, which may be rather significant, are therefore all transferred directly to the components connected to the cooling cycle. This results in a drastic temperature alternation stress which greatly reduces the component lifetime. Semiconductor modules with integrated cooler and soldering joints between semiconductors, insulating layer, and cooler are especially subjected to severe stress by this. Given the high number of cycles—a specified life of 30 years for a locomotive results in 30 annual cycles, about 11,000 daily cycles, and about 500,000 load cycles—this may result in lifetime problems.

DESCRIPTION OF THE INVENTION

It is therefore the objective of the invention to describe a coolant temperature control for regulating the coolant temperature of a power converter of an electrically driven vehicle, where said control makes it possible for the components of the power converter to be subject to less distinct load alternations, so that the entire vehicle will have a longer lifetime.

That is, at the core of the invention is the fact that the coolant temperature control regulates the coolant temperature to a set value that is independent from the current ambient temperature. In particular, it makes it possible to use an expected daily maximum, a daily average, or an optimized set value progression as a set value. Over a period of a year, the set value may follow the annual progression.

The advantages of the invention are in particular that the fluctuations of the ambient temperature are no longer directly transferred to the components in the cooling cycle, and that the coolant fluctuations caused by the greatly varying power losses during load cycles can be kept negligibly small. The extreme temperature fluctuations to which the components had been exposed can be avoided. The temperature alternation profile is significantly ameliorated by the invention, and the components achieve a life that is higher by factors between 2 and 10.

Other advantageous embodiments result from the respective dependent claims.

BRIEF DESCRIPTION OF THE DRAWINGS

The invention is explained in greater detail below in reference to the drawings using exemplary embodiments.

A summary of the reference numbers and their meanings is listed in the List of Reference Symbols. In principle, identical parts are designated with the same reference numbers in the drawings.

WAYS OF EXECUTING THE INVENTION

Figure 1:
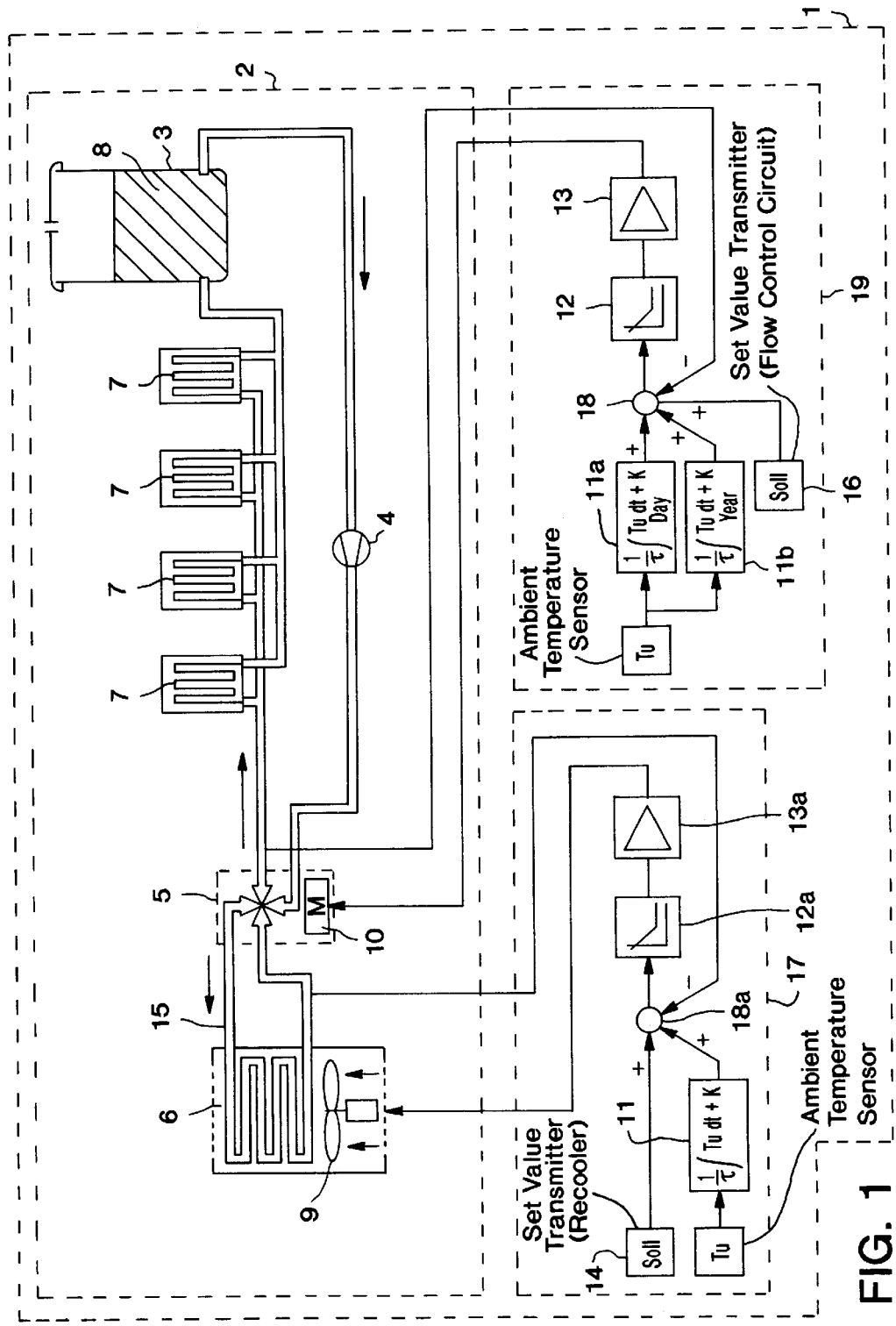
FIG. 1 shows a block diagram of the control according to the invention.

FIG. 1 shows a block diagram of a coolant temperature control 1 according to the invention. The number 2 refers to the coolant cycle. The coolant cycle comprises a compensation container 3 from which coolant 8 is supplied by a pump 4 to a mixing valve 5. In the mixer 5, the coolant coming from the compensation container 3 is coupled to or uncoupled from the recooler 6 that is part of the coolant cycle 15 of the vehicle. The mixed coolant is then supplied to the components of the power converter 7, in particular to the semiconductor components that are supposed to be cooled, and flows back from there to the compensation container 3. The temperature of the coolant 8 can be controlled by manipulating an actuator 10 of the mixer 5. The manipulation takes place as specified by the flow control circuit 19.

The flow control circuit 19 comprises an ambient temperature sensor, a flow temperature sensor, two integrators with very different integration time constants for processing the daily temperature 11a and annual temperature 11b whereby one of these integrators may be eliminated, a set value transmitter 16, a summation point 18, a regulator 12 and an amplifier 13.

The ambient temperature is processed using the integrators 11a and 11b, is added to the set value, and compared to the flow temperature. Via the regulator 12 which may be, in particular, constructed as a PI regulator, and the amplifier 13, a control differential results in a change of the mixer setting 10. Brief changes in ambient temperature which cause a change of the coolant temperature in the—possibly unregulated—recooler coolant cycle 15, as well as brief changes in the power loss provided by the power converter components 7 to the coolant cycle are compensated by the mixer manipulation. The flow temperature is not or only insignificantly affected.

In addition, a control circuit for regulating the recooler coolant cycle 17 may be provided. It consists of an ambient temperature sensor, a vehicle flow temperature sensor, an integrator 11, a set value transmitter, a summation point 18a, a regulator 12a and an amplifier 13a. The ambient temperature is processed with the integrator 11, is added to the set value, and compared to the vehicle flow temperature. Via the regulator 12a which may be, in particular, constructed as a PI regulator, and the amplifier 13a, a control differential results in a change of fan speed. The recooling which depends essentially on the air volume flow in the recooler thus can be adapted to the current power loss which must be dissipated and to the ambient temperature fluctuations. An increased volume flow in the recooler in this way reduces, for example, the effects of brief, very high ambient temperatures, as they occur in the mid-day sun.

Figure 2:
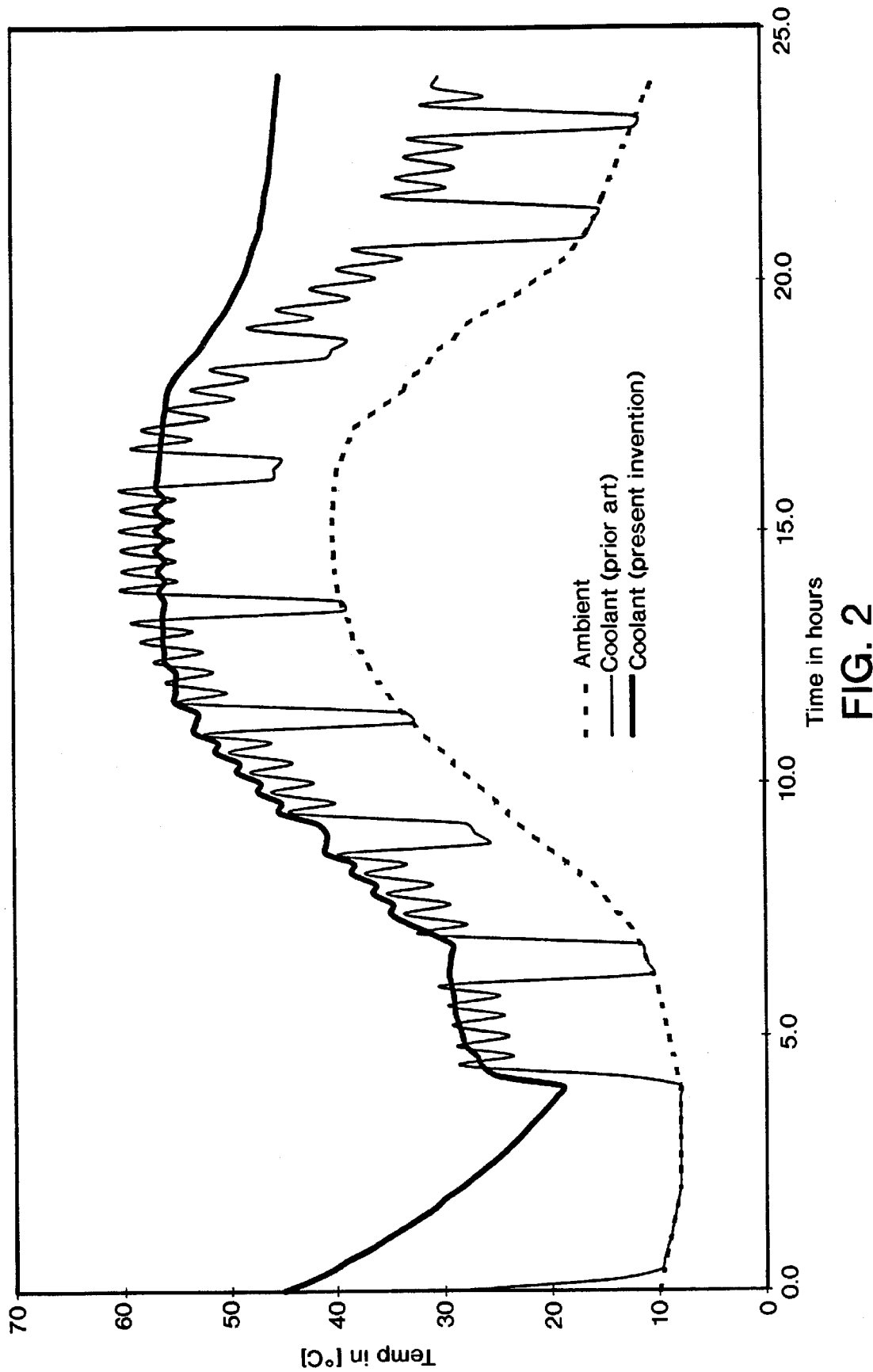
FIG. 2 shows the ambient air over the course of a day, the coolant temperature according to the state of the art, and the coolant temperature according to the invention. The example is provided for a summer day in Central Europe.

Compared to the state of the art, the above described control achieves advantageous results, as is shown in FIG. 2. Using the example of a summer day in Central Europe, FIG. 2 shows the ambient temperature over the course of a day. Also shown is the coolant temperature after the regulation according to the state of the art, whereby the coolant temperature is controlled according to the current ambient temperature, and according to the invention, whereby the coolant temperature is controlled according to a set value that is independent from the current ambient temperature.

It can be clearly seen how the coolant temperature as controlled according to the state of the art is associated with a very high number of temperature fluctuations that are due to alternating loads and range from 5 to 20K, while the solution according to the invention smoothes these coolant temperature fluctuations to a negligible value. It can also be seen that the lowest overnight temperature for the solution according to the invention is higher, and the highest daytime temperature is lower than according to the state of the art. With the solution according to the invention, the coolant temperature progresses much more evenly. The components therefore are subject to much smaller temperature load alternations. In the end, this results in an increased component life.

Overall, the invention results in a greatly reduced load alternation stress on the components, and therefore an increased vehicle life.

What is claimed is:

1. Coolant temperature for regulating the coolant temperature of a power converter of an electrically driven vehicle, wherein in the coolant temperature control, there is set a predetermined coolant temperature value which corresponds to one of an expected daily temperature maximum and an optimized daily temperature progression, wherein the predetermined coolant temperature value is at all times higher than a current ambient temperature, and the coolant temperature control regulates the coolant temperature to the predetermined coolant temperature value.

2. Coolant temperature control of claim 1, wherein the set predetermined coolant temperature value tracks an annual temperature progression.

3. Coolant temperature control of claim 2, wherein the coolant temperature control comprises a mixing valve with which a cooling cycle of the power converter can be coupled to or uncoupled from a cooling cycle of the vehicle.

4. Coolant temperature control of claim 3, wherein the coolant temperature control further comprises a coolant air recooler connected to the cooling cycle of the vehicle, and a fan positioned to provide air to the coolant air recooler, and wherein the coolant temperature control controls a speed of the fan in response to a detected difference between a current temperature value and a desired temperature value.

5. Coolant temperature control of claim 2, wherein the coolant temperature control controls a fan speed of a fan for a coolant air recooler in response to a detected difference between a current temperature value and a desired temperature value.

6. Coolant temperature control of claim 1, wherein the coolant temperature control comprises a mixing valve with which a cooling cycle of the power converter can be coupled to or uncoupled from a cooling cycle of the vehicle.

7. Coolant temperature control of claim 6, wherein the coolant temperature control controls the fan speed of a coolant air recooler in response to a detected difference between a current temperature value and a desired temperature value.

8. Coolant temperature control of claim 1, wherein the coolant temperature control controls the fan speed of a coolant air recooler in response to a detected difference between a current temperature value and a desired temperature value.

9. Coolant temperature control of claim 1, wherein the electrically driven vehicle is an electric locomotive.

10. Coolant temperature control for regulating the coolant temperature of a power converter of an electrically driven vehicle, wherein in the coolant temperature control, there is set a predetermined coolant temperature value which corresponds to a daily temperature average, and the coolant temperature control regulates the coolant temperature to the predetermined coolant temperature value.

11. Coolant temperature control of claim 10, wherein the set predetermined coolant temperature value tracks an annual temperature progression.

12. Coolant temperature control of claim 11, wherein the coolant temperature control controls a fan speed of a fan for a coolant air recooler in response to a detected difference between a current temperature value and a desired temperature value.

13. Coolant temperature control of claim 11, wherein the coolant temperature control comprises a mixing valve with which a cooling cycle of the power converter can be coupled to or uncoupled from a cooling cycle of the vehicle.

14. Coolant temperature control of claim 13, wherein the coolant temperature control further comprises a coolant air recooler connected to the cooling cycle of the vehicle, and a fan positioned to provide air to the coolant air recooler, and wherein the coolant temperature control controls a speed of the fan in response to a detected difference between a current temperature value and a desired temperature value.

15. Coolant temperature control of claim 10, wherein the coolant temperature control comprises a mixing valve with which a cooling cycle of the power converter can be coupled to or uncoupled from a cooling cycle of the vehicle.

16. Coolant temperature control of claim 15, wherein the coolant temperature control further comprises a coolant air recooler connected to the cooling cycle of the vehicle, and a fan positioned to provide air to the coolant air recooler, and wherein the coolant temperature control controls a speed of the fan in response to a detected difference between a current temperature value and a desired temperature value.

17. Coolant temperature control of claim 10, wherein the coolant temperature control controls a fan speed of a fan for a coolant air recooler in response to a detected difference between a current temperature value and a desired temperature value.

18. Coolant temperature control of claim 10, wherein the electrically driven vehicle is an electric locomotive.

* * * * *